(12) United States Patent
Li et al.

(10) Patent No.: US 8,989,154 B2
(45) Date of Patent: Mar. 24, 2015

(54) METHOD AND APPARATUS FOR INDICATING MU-MIMO MODE

(75) Inventors: Jing Li, Shanghai (CN); Chuanfeng He, Beijing (CN); Yueying Zhao, Shanghai (CN); Huan Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 13/528,934

(22) Filed: Jun. 21, 2012

(65) Prior Publication Data
US 2012/0263081 A1 Oct. 18, 2012

Related U.S. Application Data

(63) Continuation of application No. PCT/CN2010/079848, filed on Dec. 16, 2010.

(30) Foreign Application Priority Data

Dec. 21, 2009 (CN) .......................... 2009 1 0189219

(51) Int. Cl.
*H04W 4/00* (2009.01)
*H04B 7/08* (2006.01)
(Continued)

(52) U.S. Cl.
CPC ............ *H04B 7/0871* (2013.01); *H04B 7/0452* (2013.01); *H04B 7/0689* (2013.01); *H04L 1/0003* (2013.01); *H04L 1/0007* (2013.01); *H04L 1/0025* (2013.01)
USPC .......................................... 370/334; 370/438

(58) Field of Classification Search
CPC .. H04B 7/0452; H04B 7/0689; H04B 7/0871; H04L 1/0025; H04L 1/0003; H04L 1/0007
USPC .................................................. 370/334, 438
See application file for complete search history.

(56) References Cited

U.S. PATENT DOCUMENTS 7,366,137 B2 4/2008 Abrishamkar et al.
8,498,246 B2 * 7/2013 Goransson et al. ........... 370/328
(Continued)

FOREIGN PATENT DOCUMENTS

| CN | 101426229 | 5/2009 |
| CN | 101998301 | 3/2011 |
| WO | 2009/047739 | 4/2009 |

OTHER PUBLICATIONS

International Search Report, mailed Mar. 24, 2011, in corresponding International Application No. PCT/CN2010/079848 (4 pp.).
(Continued)

*Primary Examiner* — Omer S Mian
(74) *Attorney, Agent, or Firm* — Staas & Halsey LLP

(57) ABSTRACT

The present invention relates to the field of telecommunications, and discloses a method for indicating an MU-MIMO mode. In this method, first part information and second part information are constructed and sent, where formats of the first part information and the second part information indicate an MU-MIMO mode. The present invention further discloses an apparatus for indicating an MU-MIMO mode. With the method and apparatus for indicating an MU-MIMO mode, where the method and apparatus for indicating an MU-MIMO mode are disclosed in the present invention, a UE may be notified of being configured with an MU-MIMO mode when MU-MIMO is applied in a UMTS system.

15 Claims, 4 Drawing Sheets

---

Construct first part information and second part information, where formats of the first part information and the second part information indicate an MU-MIMO mode — 310

Send the first part information and the second part information to a UE — 320

(51) Int. Cl.
*H04B 7/04* (2006.01)
*H04B 7/06* (2006.01)
*H04L 1/00* (2006.01)

(56) References Cited

U.S. PATENT DOCUMENTS

| | | |
|---|---|---|
| 2008/0031191 A1 | 2/2008 | Kashima et al. |
| 2008/0117873 A1 | 5/2008 | Ranta-Aho et al. |
| 2008/0212608 A1 | 9/2008 | Haikola et al. |
| 2009/0034461 A1* | 2/2009 | Pelletier et al. ............... 370/329 |
| 2010/0220657 A1* | 9/2010 | Goransson et al. ........... 370/328 |
| 2010/0246516 A1* | 9/2010 | Pelletier et al. ............... 370/329 |
| 2011/0176519 A1* | 7/2011 | Vitthaladevuni et al. ..... 370/336 |
| 2011/0280197 A1* | 11/2011 | Brueck et al. ................. 370/329 |
| 2012/0207120 A1* | 8/2012 | Bark et al. .................... 370/329 |

OTHER PUBLICATIONS

International Search Report mailed Mar. 24, 2011 issued in corresponding International Patent Application No. PCT/CN2010/079848.

Written Opinion of the International Searching Authority mailed Mar. 24, 2011 issued in corresponding International Patent Application No. PCT/CN2010/079848.

Extended European Search Report issued Jan. 1, 2013, in corresponding European Patent Application No. 10838641.8.

Office Action, dated Apr. 1, 2013, in corresponding Chinese Application No. 200910189219.X (18 pp.).

* cited by examiner

METHOD AND APPARATUS FOR INDICATING MU-MIMO MODE

CROSS-REFERENCE TO RELATED APPLICATIONS

This application is a continuation of International Application No. PCT/CN2010/079848, filed on Dec. 16, 2010, which claims priority to Chinese Patent Application No. 200910189219.X, filed on Dec. 21, 2009, both of which are hereby incorporated by reference in their entireties.

FIELD OF THE INVENTION

The present invention relates to the field of telecommunications, and in particular, to a method and an apparatus for indicating an MU-MIMO (Multi-User Multiple Input Multiple Output) mode.

BACKGROUND OF THE INVENTION

With the development of the telecommunications technologies, more and more new technologies emerge, and MU-MIMO is a representative technology among them. In MU-MIMO technology, a transmitting end may simultaneously send data to multiple mutually paired UEs (User Equipment), which may greatly increase an average data rate of the UEs. FIG. 1 is a simplified principle diagram of MU-MIMO. As shown in FIG. 1, a transmitting end performs different precoding on data that is sent to paired UEs (or receiving ends), and then sends the data through antennas that are separated in the space; and the paired UEs decode received data to obtain their own data. In this process, the UEs may perform channel estimation and feed back an obtained channel condition to the transmitting end. The transmitting end may eliminate interference between the UEs according to information fed back by the receiving ends.

In the prior art, SU-MIMO (Single-User Multiple Input Multiple Output) has been applied in an HSDPA (High Speed Downlink Packet Access) or an HSPA (High Speed Packet Access) system. FIG. 2 is a schematic diagram of applying SU-MIMO in an HSDPA system. As shown in FIG. 2, a scheduled UE has a primary transport block and a secondary transport block, which are both borne on an HS-DSCH (High Speed Downlink Shared Channel). The two transport blocks undergo a processing process of a transport channel, spectrum spreading/scrambling processing, and precoding processing, and then are sent together with a CPICH (Common Pilot Channel) on two transmitting antennas. During precoding processing, the two transport blocks are respectively weighted by using {w1,w2}, {w3,w4} according to a precoding weight {w1,w2,w3,w4} that is generated by a base station (for example, a NodeB).

With an increasing requirement on a data transport rate, the MU-MIMO technology may be applied in a UMTS (Universal Mobile Telecommunications System) system such as HSDPA, HSPA or HSPA+. If MU-MIMO is applied in the UMTS communication system, how to notify a UE of being configured with an MU-MIMO mode becomes a problem to be solved urgently.

SUMMARY OF THE INVENTION

The present invention provides a method and an apparatus for indicating an MU-MIMO mode, so that a UE may know that it is configured with an MU-MIMO mode.

In one aspect, the present invention provides a method for indicating an MU-MIMO mode, where the method includes: constructing first part information and second part information, where formats of the first part information and the second part information indicate an MU-MIMO mode; and sending the first part information and the second part information to a user equipment (UE) through an HS-SCCH.

The formats of the first part information and the second part information indicating the MU-MIMO mode includes:

when the format of the first part information is an HS-SCCH type 3 single stream, and the format of the second part information is an HS-SCCH type 3 dual-stream, it indicates the MU-MIMO mode; or when the format of the first part information is an HS-SCCH type 3 dual-stream, and the format of the second part information is an HS-SCCH type 3 single stream, it indicates the MU-MIMO mode; or when the formats of the first part information and the second part information are an HS-SCCH type 3 single stream, a seventh bit of channelization-code-set information in the first part information indicates the MU-MIMO mode.

In another aspect, the present invention further provides an apparatus for indicating an MU-MIMO mode, where the apparatus includes: a constructing unit and a sending unit.

The constructing unit is configured to construct first information and second part information, where formats of the first part information and the second part information indicate an MU-MIMO mode; and the sending unit is configured to send the first part information and the second part information to a user equipment (UE) through an HS-SCCH. The formats of the first part information and the second part information indicate the MU-MIMO mode.

The formats of the first part information and the second part information indicating the MU-MIMO mode may include one of three manners provided in the foregoing method for indicating an MU-MIMO mode.

In another aspect, the present invention further provides an apparatus for determining an MU-MIMO mode, where the apparatus includes: a receiving unit and a determining unit.

The receiving unit is configured to receive first part information and second part information on an HS-SCCH; and the determining unit is configured to determine, according to formats of the first part information and the second part information, that a UE is configured with an MU-MIMO mode.

When the formats of the first part information and the second part information are one of the three manners provided in the foregoing method for indicating an MU-MIMO mode, the determining unit determines that the UE is configured with the MU-MIMO mode.

With the method and apparatus for indicating an MU-MIMO mode that are provided in the present invention, the UE may be notified of being configured with the MU-MIMO mode when MU-MIMO is applied in a UMTS system. With the apparatus for determining MU-MIMO provided in the present invention, the UE may know that it is configured with the MU-MIMO mode.

DETAILED DESCRIPTION OF THE EMBODIMENTS

Figure 1:
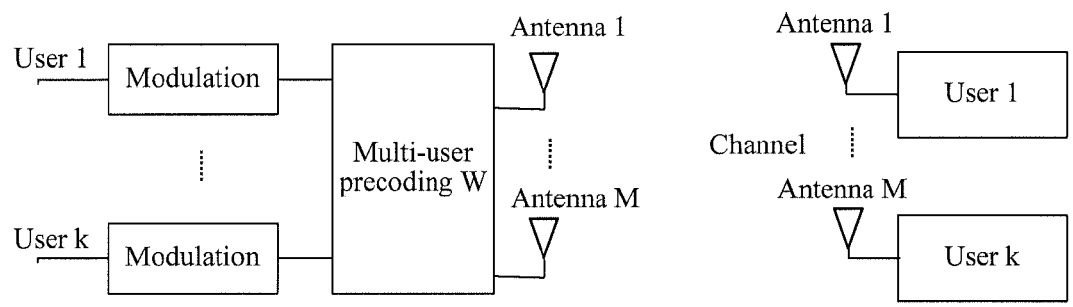
FIG. 1 is a simplified principle diagram of MU-MIMO in the prior art.
Figure 2:
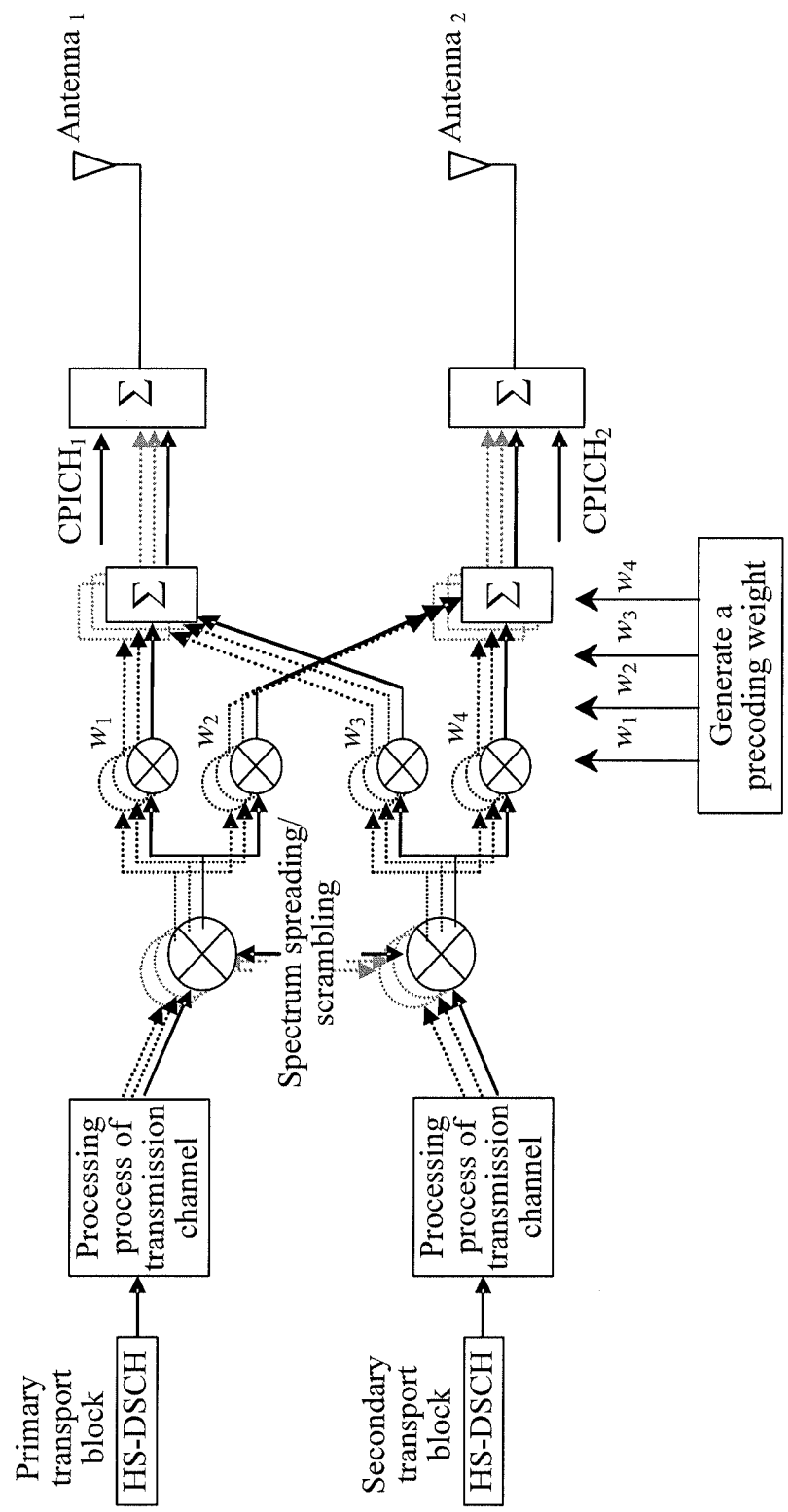
FIG. 2 is a schematic diagram of applying SU-MIMO in an HSDPA system in the prior art.

The present invention is described in further detail in the following with reference to the accompanying drawings and specific embodiments.

To describe embodiments of the present invention clearer, knowledge related to the embodiments of the present invention is introduced first. In a UMTS system, when a UE is configured with a SU-MIMO mode, control information or control signaling may be transmitted by using a physical channel with an HS-SCCH type 3 format.

For example, when only one data stream (or referred to as single stream) of the UE is transmitted on an HS-PDSCH (High Speed Physical Downlink Shared Channel), the following information may be sent on the physical channel with the HS-SCCH type 3 format:

Channelization-code-set information (7 bits): $xccs,1, xccs,2, \ldots, xccs,7$;

Modulation scheme and number of transport blocks information (3 bits): $xms,1, xms,2, xms,3$;

Precoding weight information (2 bits): $xpwipb,1, xpwipb,2$;

Transport-block size information (6 bits): $xtbspb,1, xtbspb,2, \ldots, xtbspb,6$;

Hybrid Automatic Repeat reQuest (Hybrid-ARQ) process information (4 bits): $xhap,1, xhap,2, \ldots, xhap,4$;

Redundancy and constellation version (2 bits): $xrvpb,1, xrvpb,2$; and

UE identity (16 bits): $xue,1, xue,2, \ldots, xue,16$.

When two data streams (or referred to as dual-stream) are transmitted on the HS-PDSCH, the following information may be sent on the physical channel with the HS-SCCH type 3 format:

Channelization-code-set information (7 bits): $xccs,1, xccs,2, \ldots, xccs,7$;

Modulation scheme and number of transport blocks information (3 bits): $xms,1, xms,2, xms,3$;

Precoding weight information (2 bits): $xpwipb,1, xpwipb,2$;

Transport-block size information for the primary transport block (Transport-block size information for the primary transport block) (6 bits): $xtbspb,1, xtbspb,2, \ldots, xtbspb,6$;

Transport-block size information for the secondary transport block (Transport-block size information for the secondary transport block) (6 bits): $xtbssb,1, xtbssb,2, \ldots, xtbssb,6$;

Hybrid-ARQ process information (4 bits): $xhap,1, xhap,2, \ldots, xhap,4$;

Redundancy and constellation version for the primary transport block (2 bits): $xrvpb,1, xrvpb,2$;

Redundancy and constellation version for the secondary transport block (2 bits): $xrvsb,1, xrvsb,2$; and UE identity (16 bits): $xue,1, xue,2, \ldots, xue,16$.

Generally, in one HS-SCCH type 3 subframe, the "channelization-code-set information", the "modulation scheme and number of transport blocks information", the "precoding weight information", and the "UE identity" are sent in a slot 1 of the HS-SCCH type 3 subframe. For an HS-SCCH type 3 single stream, the "transport-block size information", the "hybrid-ARQ process information", the "redundancy and constellation version", and the "UE identity" are sent in a slot 2 and a slot 3 of the HS-SCCH type 3 subframe; and for an HS-SCCH type 3 dual-stream, the "transport-block size information for the primary transport block", the "transport-block size information for the secondary transport block", the "hybrid-ARQ process information", the "redundancy and constellation version for the primary transport block", the "redundancy and constellation version for the secondary transport block", and the "UE identity" are sent in the slot 2 and the slot 3 of the HS-SCCH type 3 subframe. Therefore, the foregoing information sent on the physical channel of HS-SCCH type 3 may be divided into two parts, that is: the information sent in the slot 1 is first part information; and the information sent in the slot 2 and the slot 3 is second part information.

Figure 3:
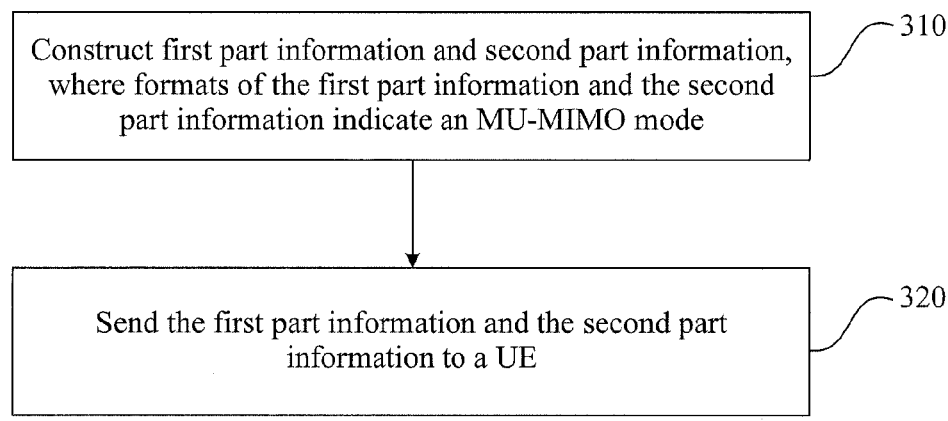
FIG. 3 is a schematic flow chart of a method for indicating an MU-MIMO mode according to an embodiment of the present invention.

FIG. 3 is a schematic flow chart of a method for indicating an MU-MIMO mode according to an embodiment of the present invention. As shown in FIG. 3, the method may include:

Step 310: Construct first part information and second part information, where formats of the first part information and the second part information indicate an MU-MIMO mode.

In this embodiment, the formats of the first part information and the second part information indicating the MU-MIMO mode may include one of the following manners:

Manner 1: When the format of the first part information is an HS-SCCH type 3 single stream and the format of the second part information is an HS-SCCH type 3 dual-stream, it indicates the MU-MIMO mode.

Manner 2: When the format of the first part information is an HS-SCCH type 3 dual-stream and the format of the second part information is an HS-SCCH type 3 single stream, it indicates the MU-MIMO mode.

Manner 3: When the formats of the first part information and the second part information are an HS-SCCH type 3 single stream, a seventh bit of "channelization-code-set information" in the first part information indicates the MU-MIMO mode.

Step 320: Send the first part information and the second part information to a user equipment (UE).

In this embodiment, the first part information and the second part information may be sent to the UE through an HS-SCCH.

With the method for indicating an MU-MIMO mode provided in this embodiment, the UE may be notified of being configured with the MU-MIMO mode when MU-MIMO is applied in a UMTS system, so that the UE performs processing such as data decoding and interference elimination.

When the MU-MIMO mode is indicated through the foregoing three manners, the UE may determine formats of the first part information and the second part information by using blind detection, so as to determine whether the UE is configured with the MU-MIMO mode.

When the first manner is adopted to indicate the MU-MIMO mode, the format of the first part information being an HS-SCCH type 3 single stream means that the format of the first part information sent on the HS-SCCH is the same as a format of first part information of the HS-SCCH type 3 single stream, for example, the "channelization-code-set information", the "modulation scheme and number of transport blocks information", the "precoding weight information", and the "UE identity" are included; and the "modulation scheme and number of transport blocks information" indicates a single stream.

Persons of ordinary skill in the art may understand that, when the first manner is adopted to indicate the MU-MIMO mode, because the format of the second part information is an HS-SCCH type 3 dual-stream and the UE has only one data stream, data stream information of a paired UE of the UE may be transmitted in the "transport-block size information for the secondary transport block" field and the "redundancy and constellation version for the secondary transport block" field of the second part information. For example, transport-block size information of the paired UE may be transmitted in the "transport-block size information for the secondary transport block" field in the second part information; and redundancy and constellation version information for a transport block of the paired UE may be transmitted in the "redundancy and constellation version for the secondary transport block" field. Accordingly, the UE may further eliminate interference according to the data stream information of its paired UE, so as to reduce the interference between UEs. For example, the UE may remove the precoding weight and decoding the received data of the paired UE according to the data stream information of its paired UE, so as to further eliminate the interference.

Therefore, when the first manner is adopted to indicate the MU-MIMO mode, the format of the second part information being an HS-SCCH type 3 dual-stream means that the format of the second part information sent on the HS-SCCH channel is the same as a format of second part information of the HS-SCCH type 3 dual-stream, for example, the "transport-block size information", the "hybrid-ARQ process information", the "redundancy and constellation version for the transport block", the "UE identity", and a "redundancy and constellation version for the transport block of the paired UE of the UE" and a "transport-block size information of the paired UE of the UE" are included.

When the second manner is adopted to indicate the MU-MIMO mode, the format of the first part information being an HS-SCCH type 3 dual-stream means that the format of the first part information sent on the HS-SCCH channel is the same as a format of first part information of the HS-SCCH type 3 dual-stream, for example, the "channelization-code-set information", the "modulation scheme and number of transport blocks information", the "precoding weight information", and the "UE identity" are included; and the "modulation scheme and number of transport blocks information" indicates a dual-stream. The format of the second part information being an HS-SCCH type 3 single stream means that the second part information sent on the HS-SCCH channel includes the "transport-block size information", the "hybrid-ARQ process information", the "redundancy and constellation version", and the "UE identity".

How to indicate the MU-MIMO mode through the formats of the first part information and the second part information is further described in the following with reference to an example. Table 1 shows correspondence among a code of the "modulation scheme and number of transport blocks information", a modulation manner of a primary transport block, a modulation manner of a secondary transport block, and the number of transport blocks when a SU-MIMO mode is applied in the UMTS system.

TABLE 1

| Code of "modulation scheme and number of transport blocks information" (xms,1, xms,2, xms,3) | Modulation for primary transport block | Modulation for secondary transport block | Number of transport blocks |
|---|---|---|---|
| 111 | 16QAM | 16QAM | 2 |
| 110 | 16QAM | QPSK | 2 |
| 101 | 64QAM | Indicated by xccs,7 | Indicated by xccs,7 |
| 100 | 16QAM | n/a | 1 |
| 011 | QPSK | QPSK | 2 |
| 010 | 64QAM | 64QAM | 2 |
| 001 | 64QAM | 16QAM | 2 |
| 000 | QPSK | n/a | 1 |

As shown in Table 1, when the UE is configured with a SU-MIMO mode and a single stream, the code of the "modulation scheme and number of transport blocks information" in the first part information is "000" or "100", and the format of the second part information is an HS-SCCH type 3 single stream.

In this embodiment, if the first manner is adopted to indicate an MU-MIMO mode, the code of the "modulation scheme and number of transport blocks information" in the first part information may be set to "000" or "100", and the format of the second part information may be set to an HS-SCCH type 3 dual-stream, so as to indicate the MU-MIMO mode. Accordingly, when the UE receives the first part information and the second part information, the format of the first part information is parsed as a single stream, and the format of the second part information is an HS-SCCH type 3 dual-stream, so that it may be determined that the UE is configured with the MU-MIMO mode. For example, the UE may adopt a blind detection manner to determine the formats of the first part information and the second part information, or adopt another possible manner to determine the formats of the first part information and the second part information.

In this embodiment, if the second manner is adopted to indicate the MU-MIMO mode, the code of the "modulation scheme and number of transport blocks information" in the first part information may be set to "111", or "110", or "011", or "010", or "001", and the format of the second part information may be set to an HS-SCCH type 3 single stream, so as to indicate the MU-MIMO mode. Accordingly, when the UE receives the first part information and the second part information, the format of the first part information is parsed as an HS-SCCH type 3 dual-stream, and the format of the second part information is an HS-SCCH type 3 single stream, so that it may be determined that the UE is configured with the MU-MIMO mode. For example, the UE may adopt a blind detection manner to determine the formats of the first part information and the second part information, or may also adopt another possible manner to determine the formats of the first part information and the second part information.

In this embodiment, if the third manner is adopted to indicate the MU-MIMO mode, the formats of the first part information and the second part information may be set to an HS-SCCH type 3 single stream, and the seventh bit "xccs,7" of the channelization-code-set information may be set to indicate the MU-MIMO mode. For example, when the "xccs,7" is set to 1 or 0, the MU-MIMO mode is represented. Accordingly, when the UE parses that the formats of the first part information and the second part information are an HS-SCCH type 3 single stream, the seventh bit "xccs,7" of the "channelization-code-set information" is further parsed to determine whether the UE is configured with the MU-MIMO mode.

With the method for indicating an MU-MIMO mode provided in this embodiment, few changes are made to the prior art; and the UE only needs to detect the formats of the received first part information and second part information to determine whether the UE is configured with the MU-MIMO mode, which is beneficial to compatibility of a system.

Persons of ordinary skill in the art may understand that, in another embodiment, several bits may be added in information transmitted on a physical channel of an HS-SCCH type 3 single stream format to indicate the MU-MIMO mode. For example, one bit may be added in the information transmitted on the physical channel of the HS-SCCH type 3 single stream format to indicate the MU-MIMO mode, and this bit may be located in the first part information or in the second part information.

Further, the "precoding weight information" of the UE in the constructed first part information may be orthogonal to precoding weight information of the paired UE of the UE. In this way, interference between mutually paired UEs may be reduced. Table 2 shows an example of a corresponding relationship between codes of the "precoding weight information" of the UE and codes of the "precoding weight information" of the paired UE.

TABLE 2

| Code of "Precoding weight information" of UE (xpwipb,1, xpwipb,2) | Code of "Precoding weight information" of paired UE (xpwipb,1, xpwipb,2) |
| --- | --- |
| 00 | 11 |
| 01 | 10 |
| 10 | 01 |
| 11 | 00 |

Persons of ordinary skill in the art may understand that, other corresponding relationships may exist between codes of "precoding weight information" of mutually paired UEs, where the codes of the "precoding weight information" of the mutually paired UEs are shown in Table 2, as long as the codes of the "precoding weight information" of the mutually paired UEs satisfy an orthogonal relationship.

Figure 4:
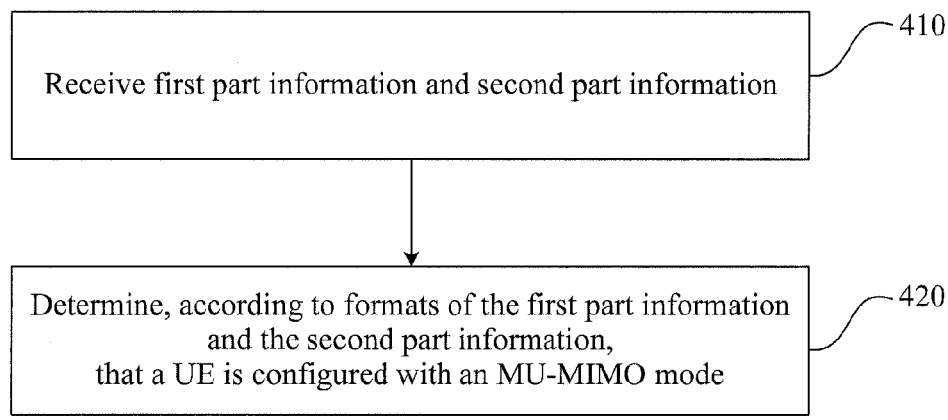
FIG. 4 is a schematic flow chart of a method for determining an MU-MIMO mode according to another embodiment of the present invention.

FIG. 4 shows a method for determining an MU-MIMO mode according to another embodiment of the present invention. As shown in FIG. 4, the method may include:

Step 410: Receive first part information and second part information.

In this embodiment, the first part information and the second part information may be received through an HS-SCCH.

Step 420: Determine, according to formats of the first part information and the second part information, that a user equipment (UE) is configured with an MU-MIMO mode.

In this embodiment, the formats of the first part information and the second part information indicate the MU-MIMO mode. The formats of the first part information and the second part information indicating the MU-MIMO mode include at least three manners provided in the embodiment as shown in FIG. 3. Therefore, the determining that the user equipment (UE) is configured with the MU-MIMO mode according to the formats of the first part information and the second part information in step 420 may include at least three manners:

Manner 1: When the format of the first part information is an HS-SCCH type 3 single stream, and the format of the second part information is an HS-SCCH type 3 dual-stream, it is determined that the UE is configured with the MU-MIMO mode.

Manner 2: When the format of the first part information is an HS-SCCH type 3 dual-stream, and the format of the second part information is an HS-SCCH type 3 single stream, it is determined that the UE is configured with the MU-MIMO mode.

Manner 3: When the formats of the first part information and the second part information are an HS-SCCH type 3 single stream, according to a seventh bit of channelization-code-set information in the first part information, it is determined that the UE is configured with the MU-MIMO mode.

With the method for determining an MU-MIMO mode provided in this embodiment, the UE may determine, according to the formats of the first part information and the second part information, whether the UE is configured with the MU-MIMO mode.

For specific formats and codes of the foregoing first part information and second part information, reference may be made to the description in the embodiment shown in FIG. 3, which are not described here again.

In this embodiment, when the UE parses that "modulation scheme and number of transport blocks information" in the first part information indicates an HS-SCCH type 3 single stream, and the second part information indicates an HS-SCCH type 3 dual-stream, it is determined that the UE is configured with the MU-MIMO mode. Alternatively, when the UE parses that "modulation scheme and number of transport blocks information" in the first part information indicates an HS-SCCH type 3 dual-stream, and the second part information indicates an HS-SCCH type 3 dual-stream, it is determined that the UE is configured with the MU-MIMO mode. Alternatively, when the UE parses that the formats of the first part information and the second part information are an HS-SCCH type 3 single stream, whether the UE is configured with the MU-MIMO mode is further determined according to the seventh bit "xccs,7" of the "channelization-code-set information".

Further, "precoding weight information" of the UE in the first part information may be orthogonal to precoding weight information of a paired UE of the UE. In this way, interference between mutually paired UEs may be reduced. For one example of a corresponding relationship between a code of the "precoding weight information" of the UE and a code of the precoding weight information of the paired UE of the UE, reference may be made to Table 2.

Figure 5:
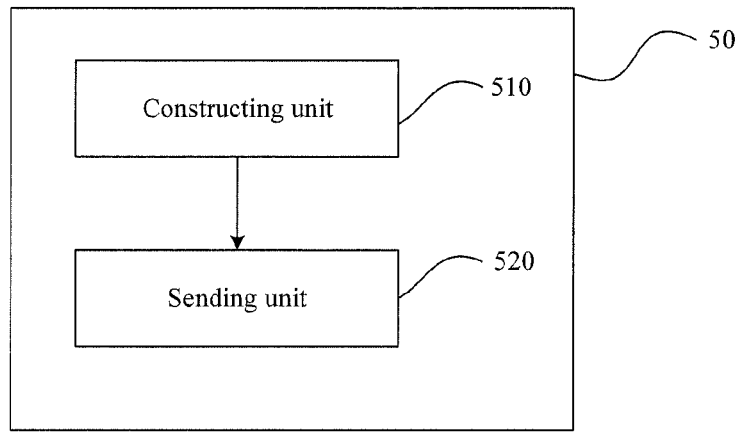
FIG. 5 is a schematic structural diagram of an apparatus for indicating an MU-MIMO mode according to another embodiment of the present invention.

FIG. 5 is a schematic structural diagram of an apparatus for indicating an MU-MIMO mode according to another embodiment of the present invention. As shown in FIG. 5, the apparatus for indicating an MU-MIMO mode 50 includes a constructing unit 510 and a sending unit 520.

The constructing unit 510 is configured to construct first part information and second part information, where formats of the first part information and the second part information indicate an MU-MIMO mode.

In this embodiment, for the formats of the first part information and the second part information indicating the MU-MIMO mode, reference may be made to three manners described in the embodiment shown in FIG. 3, which is not described here again.

The sending unit 520 is configured to send the first part information and the second part information to a UE.

In this embodiment, the first part information and the second part information may be sent to the UE through an HS-SCCH.

With the apparatus for indicating an MU-MIMO mode provided in this embodiment, the UE may be notified of being configured with an MU-MIMO mode when MU-MIMO is applied in a UMTS system, so that the UE performs processing such as data decoding and interference elimination.

For implementation details of the apparatus for indicating an MU-MIMO mode provided in this embodiment, and specific formats and codes of the first part information and the second part information in the foregoing three manners, reference may be made to the description in the method embodiment, which are not described here again.

Further, "precoding weight information" of the UE, included in the first part information, may be orthogonal to precoding weight information of a paired UE of the UE. In this way, interference between mutually paired UEs may be reduced. For one example of a corresponding relationship between a code of the "precoding weight information" of the UE and a code of the precoding weight information of the paired UE of the UE, reference may be made to Table 2.

Figure 6:
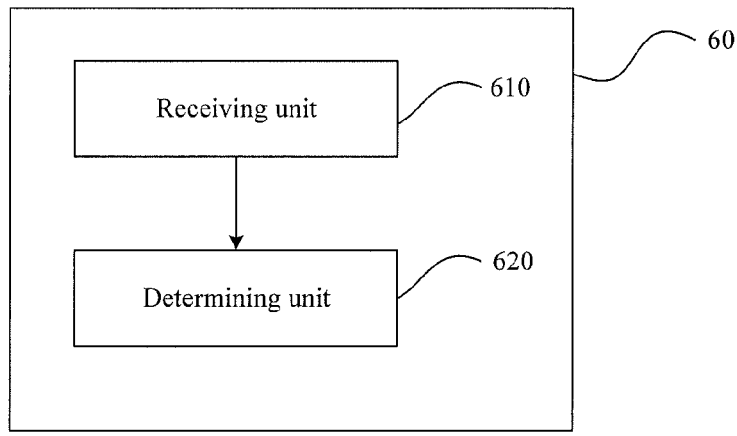
FIG. 6 is a schematic structural diagram of an apparatus for determining an MU-MIMO mode according to another embodiment of the present invention.

FIG. 6 is a schematic structural diagram of an apparatus for determining an MU-MIMO mode according to another embodiment of the present invention. As shown in FIG. 6, the apparatus for determining an MU-MIMO mode 60 includes a receiving unit 610 and a determining unit 620.

The receiving unit 610 is configured to receive first part information and second part information.

In this embodiment, formats of the first part information and the second part information indicate an MU-MIMO mode, and may include at least three indication manners listed in the embodiment shown in FIG. 3.

The determining unit 620 is configured to determine, according to the formats of the first part information and the second part information, that a UE is configured with an MU-MIMO mode.

In this embodiment, the receiving unit 610 may receive the first part information and the second part information on an HS-SCCH.

In this embodiment, the UE may determine the formats of the first part information and the second part information through blind detection, or may determine the formats of the first part information and the second part information through another possible manner. When the format of the first part information is an HS-SCCH type 3 single stream, and the format of the second part information is an HS-SCCH type 3 dual-stream, the determining unit 620 may determine that the UE is configured with the MU-MIMO mode. Alternatively, when the format of the first part information is an HS-SCCH type 3 dual-stream, and the format of the second part information is an HS-SCCH type 3 single stream, the determining unit 620 may determine that the UE is configured with the MU-MIMO mode. Alternatively, when the formats of the first part information and the second part information are an HS-SCCH type 3 single stream, the determining unit 620 may determine, according to a seventh bit of "channelization-code-set information" in the first part information, that the UE is configured with the MU-MIMO mode.

For implementation details of the apparatus for determining an MU-MIMO mode provided in this embodiment, and specific formats and codes of the first part information and the second part information, reference may be made to the description in the method embodiment, which are not described here again.

Further, "precoding weight information" of the UE in the first part information may be orthogonal to precoding weight information of a paired UE of the UE. In this way, interference between mutually paired UEs may be reduced. For one example of a corresponding relationship between a code of the "precoding weight information" of the UE and a code of the precoding weight information of the paired UE of the UE, reference may be made to Table 2.

Persons of ordinary skill in the art may understand that the apparatus for indicating the MU-MIMO mode shown in FIG. 5 may also be a logical unit or a physical unit in a base station; and the apparatus for determining the MU-MIMO mode shown in FIG. 6 may be a logical unit or a physical unit in a UE.

Figure 7:
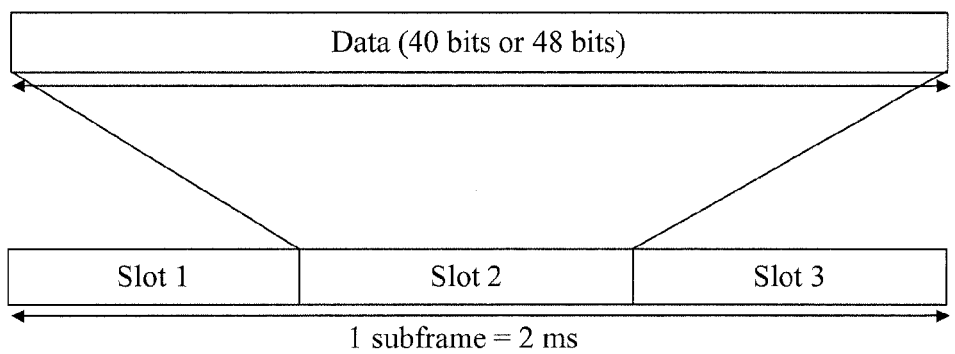
FIG. 7 is a schematic structural diagram of an HS-SCCH subframe according to another embodiment of the present invention.

FIG. 7 is a schematic structural diagram of an HS-SCCH subframe according to another embodiment of the present invention, where the HS-SCCH subframe may be used to indicate an MU-MIMO mode to a UE. As shown in FIG. 7, one 2 ms subframe includes three slots, that is: a slot 1, a slot 2, and a slot 3. In this embodiment, the MU-MIMO mode may be indicated through information transmitted in the three slots.

For example, the following information may be transmitted in the three slots to indicate that the UE is configured with an MU-MIMO mode:

Channelization-code-set information (7 bits): xccs,1, xccs,2, ..., xccs,7;

Modulation scheme and number of transport blocks information (3 bits): xms,1, xms,2, xms,3;

Precoding weight information (2 bits): xpwipb,1, xpwipb,2;

Transport-block size information (6 bits): xtbspb,1, xtbspb,2, ..., xtbspb,6;

Transport-block size information for the secondary transport block of the paired UE (6 bits): xtbssb,1, xtbssb,2, ..., xtbssb,6;

Hybrid-ARQ process information (4 bits): xhap,1, xhap,2, ..., xhap,4;

Redundancy and constellation version for the transport block (2 bits): xrvpb,1, xrvpb,2;

Redundancy and constellation version for the secondary transport block of the paired UE (2 bits): xrvsb,1, xrvsb,2; and UE identity (16 bits): xue,1, xue,2, ..., xue,16.

When 3 bits of the "modulation and data block information" are "000" or "100", the 3 bits may be used to indicate that the UE is configured with the MU-MIMO mode. Codes of other information may be the same as codes of an SU-MIMO mode in the prior art, which is not described here again.

As described in the foregoing, the "transport-block size information for the secondary transport block of the paired UE" of the UE and the "redundancy and constellation version for the secondary transport block of the paired UE" of the UE are also transmitted in this subframe. In this way, the UE may further eliminate interference according to data stream information of its paired UE, so as to reduce interference between UEs.

For example, the following information may be further transmitted in the three slots to indicate that the UE is configured with the MU-MIMO mode:

Channelization-code-set information (7 bits): xccs,1, xccs,2, ..., xccs,7;

Modulation scheme and number of transport blocks information (3 bits): xms,1, xms,2, xms,3;

Precoding weight information (2 bits): xpwipb,1, xpwipb,2;

Transport-block size information (6 bits): xtbspb,1, xtbspb,2, ..., xtbspb,6;

Hybrid-ARQ process information (4 bits): xhap,1, xhap,2, ..., xhap,4;

Redundancy and constellation version for the transport block (2 bits): xrvpb,1, xrvpb,2; and UE identity (16 bits): xue,1, xue,2, ..., xue,16.

When a code of the "modulation scheme and number of transport blocks information" is "111", or "110", or "011", or "010", the code of the "modulation scheme and number of transport blocks information" may be used to indicate that the UE is configured with the MU-MIMO mode. Alternatively, when a code of the "modulation scheme and number of transport blocks information" is "000" or "100", a seventh bit "xccs,7" of the "channelization-code-set information" is set to indicate that the UE is configured with the MU-MIMO mode. For example, when "xccs,7" is set to "0" or "1", it is indicated that the UE is configured with the MU-MIMO mode.

Codes of other information may be the same as codes of an SU-MIMO mode in the prior art, which is not described here again.

Through the HS-SCCH subframe provided in this embodiment, when an MU-MIMO mode is applied in a UMTS system, the UE may know that the UE is configured with the MU-MIMO mode, so as to perform processing such as data decoding and interference elimination.

Through the description of the foregoing embodiments, persons skilled in the art may clearly understand that, the present invention may be implemented through hardware, and may also be implemented by means of software plus necessary hardware. Based on such understanding, the technical solutions of the present invention may be embodied in the form of a software product. This software product may be stored in a nonvolatile storage medium, (for example, may be a CD-ROM, a USB disk, or a removable hard disk) and includes several instructions for instructing a computer device (for example, a personal computer, a server, or a network device) to perform the method described in each embodiment of the present invention.

The foregoing descriptions are merely exemplary embodiments of the present invention, but are not intended to limit the protection scope of the present invention. Any modification, equivalent replacement, or improvement made without departing from the spirit and principle of the present invention should all fall within the protection scope of the present invention.

What is claimed is:

1. A method for indicating a multi-user multiple input multiple output (MU-MIMO) mode to a user equipment (UE), comprising:
    constructing first part information and second part information, wherein formats of the first part information and the second part information are on basis of transmission modes of data streams, the data stream transmission mode based formats of the first part information and the second part information utilized to indicate an MU-MIMO mode to the UE; and
    sending the first part information and the second part information to the UE through a high speed shared control channel (HS-SCCH), wherein
    if an HS-SCCH type 3 single stream format is used for the first part information, and an HS-SCCH type 3 dual-stream format is used for the second part information, it is indicative of the MU-MIMO mode,
    if an HS-SCCH type 3 dual-stream format is used for the first part information, and an HS-SCCH type 3 single stream format is used for the second part information, it is indicative of the MU-MIMO mode, and
    if the formats of the first part information and the second part information are an HS-SCCH type 3 single stream, a seventh bit of channelization-code-set information in the first part information indicates the MU-MIMO mode to the UE.

2. The method according to claim 1, wherein
when the format of the first part information is the HS-SCCH type 3 single stream, the first part information comprises channelization-code-set information, modulation scheme and number of transport blocks information, precoding weight information, and a UE identity, and the modulation scheme and number of transport blocks information indicates a single stream; and
    when the format of the second part information is the HS-SCCH type 3 dual-stream, the second part information comprises transport-block size information, hybrid automatic repeat request process information, a redundancy and constellation version for a transport block, a UE identity, transport-block size information of a paired UE of the UE, and a redundancy and constellation version for a transport block of the paired UE of the UE.

3. The method according to claim 1, wherein when the format of the first part information is the HS-SCCH type 3 dual-stream, the first part information comprises channelization-code-set information, modulation scheme and number of transport blocks information, precoding weight information, and a UE identity, and the modulation scheme and number of transport blocks information indicates a dual-stream; and
    when the format of the second part information is the HS-SCCH type 3 single stream, the second part information comprises transport-block size information, hybrid automatic repeat request process information, a redundancy and constellation version, and a UE identity.

4. The method according to claim 1, wherein when the formats of the first part information and the second part information are the HS-SCCH type 3 single stream, the seventh bit of the channelization-code-set information in the first part information indicating the MU-MIMO mode comprises:
    when a code of the modulation scheme and number of transport blocks information in the first part information is 100 or 000, the seventh bit of the channelization-code-set information indicates the MU-MIMO mode.

5. The method according to claim 1, wherein
precoding weight information in the first part information is orthogonal to precoding weight information of the paired UE of the UE.

6. An apparatus for indicating a multi-user multiple input multiple output (MU-MIMO) mode to a user equipment (UE), the apparatus comprising:
    nonvolatile computer readable storage medium that stores program(s), and
    computer hardware configured to implement, including configured by the program(s) to implement:
        a constructing unit, configured to construct first part information and second part information, wherein formats of the first part information and the second part information are on basis of transmission modes of data streams, the data stream transmission mode based formats of the first part information and the second part information utilized to determine an MU-MIMO mode to the UE; and
        a sending unit, configured to send the first part information and the second part information to the UE through a high speed shared control channel (HS-SCCH),
    wherein:
        if an HS-SCCH type 3 single stream format is used for the first part information, and an HS-SCCH type 3 dual-stream format is used for the second part information, it is indicative of the MU-MIMO mode,
        if an HS-SCCH type 3 dual-stream format is used for the first part information, and an HS-SCCH type 3 single stream format is used for the second part information, it is indicative of the MU-MIMO mode, and if the formats of the first part information and the second part information are an HS-SCCH type 3 single stream, a seventh bit of channelization-code-set information in the first part information indicates the MU-MIMO mode to the UE.

7. The apparatus according to claim 6, wherein when the format of the first part information is the HS-SCCH type 3 single stream, the first part information comprises channelization-code-set information, modulation scheme and number of transport blocks information, precoding weight information, and a UE identity, and the modulation scheme and number of transport blocks information indicates a single stream; and when the format of the second part information is the HS-SCCH type 3 dual-stream, the second part information comprises transport-block size information, hybrid automatic repeat request process information, a redundancy and constellation version for a transport block, a UE identity, transport-block size information of a paired UE of the UE, and a redundancy and constellation version for a transport block of the paired UE of the UE.

8. The apparatus according to claim 6, wherein when the format of the first part information is the HS-SCCH type 3 dual-stream, the first part information comprises channelization-code-set information, modulation scheme and number of transport blocks information, precoding weight information and a UE identity, and the modulation scheme and number of transport blocks information indicates a dual-stream; and when the format of the second part information is the HS-SCCH type 3 single stream, the second part information comprises transport-block size information, hybrid automatic repeat request process information, a redundancy and constellation version, and a UE identity.

9. The apparatus according to claim 6, wherein when the formats of the first part information and the second part information are the HS-SCCH type 3 single stream, the seventh bit of the channelization-code-set information in the first part information indicating the MU-MIMO mode comprises:

when a code of the modulation scheme and number of transport blocks information in the first part information is 100 or 000, the seventh bit of the channelization-code-set information indicates the MU-MIMO mode.

10. The apparatus according to claim 6, wherein
precoding weight information in the first part information is orthogonal to precoding weight information of the paired UE of the UE.

11. An apparatus configured to implement a User Equipment (UE) capable of determining a multi-user multiple input multiple output (MU-MIMO) mode of the UE, the apparatus comprising:
nonvolatile computer readable storage medium that stores program(s), and
computer hardware configured to implement, including configured by the program(s) to implement:
a receiving unit, configured to receive first part information and second part information on a high speed shared control channel (HS-SCCH); and
a determining unit, configured to determine, according to data stream transmission mode based formats of the first part information and the second part information, that the UE is configured with an MU-MIMO mode, wherein if an HS-SCCH type 3 single stream format is used for the first part information and an HS-SCCH type 3 dual-stream format is used for the second part information, it is indicative of the MU-MIMO mode, if an HS-SCCH type 3 dual-stream format is used for the first part information, and an HS-SCCH type 3 single stream format is used for the second part information, is indicative of the MU-MIMO mode, and if the formats of the first part information and the second part information are an HS-SCCH type 3 single stream, a seventh bit of channelization-code-set information in the first part information indicates the UE is configured with the MU-MIMO mode.

12. The apparatus according to claim 11, wherein
when the format of the first part information is the HS-SCCH type 3 single stream, the first part information comprises channelization-code-set information, modulation scheme and number of transport blocks information, precoding weight information, and a UE identity, and the modulation scheme and number of transport blocks information indicates a single stream; and when the format of the second part information is the HS-SCCH type 3 dual-stream, the second part information comprises transport-block size information, hybrid automatic repeat request process information, a redundancy and constellation version for a transport block, a UE identity, transport-block size information of a paired UE of the UE, and a redundancy and constellation version for a transport block of the paired UE of the UE.

13. The apparatus according to claim 11, wherein when the format of the first part information is the HS-SCCH type 3 dual-stream, the first part information comprises channelization-code-set information, modulation scheme and number of transport blocks information, precoding weight information, and a UE identity, and the modulation scheme and number of transport blocks information indicates a dual-stream; and when the format of the second part information is the HS-SCCH type 3 single stream, the second part information comprises transport-block size information, hybrid automatic repeat request process information, a redundancy and constellation version, and a UE identity.

14. The apparatus according to claim 11, wherein when the formats of the first part information and the second part information are the HS-SCCH type 3 single stream, the determining unit determining, according to the seventh bit of the channelization-code-set information in the first part information, that the UE is configured with the MU-MIMO mode comprises:

when a code of the modulation and data block information in the first part information is 100 or 000, the determining unit determines, according to the seventh bit of the channelization-code-set information, that the UE is configured with the MU-MIMO mode.

15. The apparatus according to claim 11, wherein
precoding weight information in the first part information is orthogonal to precoding weight information of the paired UE of the UE.

* * * * *